United States Patent Office — 2,733,248, Patented Jan. 31, 1956

2,733,248

POLYHALO EPOXY METHANE NAPHTHALENE COMPOUNDS

Rex E. Lidov, Denver, Colo., assignor to Shell Development Company, Emeryville, Calif., a corporation of Delaware No Drawing. Application February 17, 1953, Serial No. 337,425

8 Claims. (Cl. 260—346.2)

This invention relates to a new class of compounds and to a method for their preparation. More particularly, it relates to a class of polyhalopolybicyclo organic compounds which are useful themselves as, and as intermediates in the preparation of, plasticizers for resinous materials, flame-proofing materials for synthetic resin, extreme pressure agents for use in lubricating compositions, insecticides, herbicides, etc.

It has now been found that particularly useful compounds are obtainble by the Diels-Alder adduction of polyhalocyclopentadienes reacting as dienes to 7-oxabicyclo(2.2.1)-heptenes reacting as dienophiles. The compounds thus produced are polyhalo-1,4-epoxy-5,8-methanonaphthalene compounds containing a plurality of halogen atoms on the 5,8-methano-substituted ring and a polar group on the 1,4-epoxy-substituted ring. The halogen atoms in the compound are the halogen atoms present in the polyhalocyclopentadiene compound, and the polar substituents on the 1,4-epoxy-substituted ring result from such groups present, or as modified by subsequent reaction, in the 7-oxabicycloheptenes utilized as dienophiles. These latter are obtained in a Diels-Alder reaction of a furan compound, as the diene, with an unsaturated compound active as a dienophile therefor.

The compounds of the invention can be represented by the following planar structural formula:

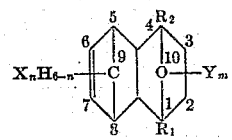

wherein the plurality ($n$) up to 6 of halogen atoms "X" are the same or different halogen atoms, preferably middle halogens, that is to say, halogens of atomic number from 17 to 35, inclusive. Most commonly, all of the halogen atoms will be chlorine atoms and $n$ will be greater than 3, the halogen atoms being attached to carbon atoms of the cyclopentene ring defined by carbon atoms 5, 6, 7, 8 and 9. Y represents a polar group ($m$ is one or two) which activates a C-to-C unsaturated linkage when attached directly to one of the unsaturated C-atoms thereof, such as

each such Y preferably containing no more than about 16 carbon atoms. $R_1$ and $R_2$ are either hydrogen atoms or lower alkyl radicals, preferably of no more than four carbon atoms each; the remaining available valence bonds are satisfied by hydrogen atoms or lower alkyl groups, preferably of 1 to 2 carbon atoms except that the remaining valences on C's 2 and 3 may be wholly satisfied by an additional bond between the two giving rise to a double bond between these two carbon atoms.

The compounds of the invention are suitably prepared by the Diels-Alder reaction of the polyhalocyclopentadienes, such as hexachlorocyclopentadiene or 1,2,3,4-tetrachloro-1,3-cyclopentadiene, with the 7-oxabicycloheptenes, such as are obtained by the Diels-Alder adduction of furan to a suitably reactive dienophile, such as maleic anhydride, diethyl acetylenedicarboxylate, etc. The polar group in the furan-dienophile adduct can be modified, as by hydrolysis, esterification, and the like, prior to adducting it with the polyhalocyclopentadiene. Similarly, it can be suitably modified after the tetracyclo compound is prepared. Thus, in the case of the anhydride, this group can be either completely or partially esterified.

As illustrative, hexachlorocyclopentadiene reacts with the furan-maleic anhydride adduct to give 5,6,7,8,9,9-hexachloro-1,2,3,4,4a,5,8,8a,-octahydro-1,4-epoxy-5,8-methanonaphthalene-2,3-dicarboxylic anhydride, designated A–I, which can be represented by I.

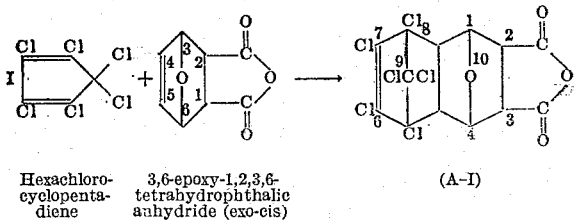

Hexachlorocyclopentadiene   3,6-epoxy-1,2,3,6-tetrahydrophthalic anhydride (exo-cis)   (A–I)

It is not known with certainty what is the stereochemical structure of the product A–I. However, it is known that furan-maleic anhydride adduct has the exo-cis structure:

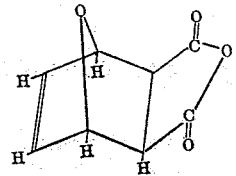

in which the anhydride group is on the same side of the cyclohexene ring as the epoxy bridge. Also, it has been established in the preparation of the insecticide known as aldrin, obtained by the adduction of hexachlorocyclopentadiene with bicyclo(2.2.1)-2,5-heptadiene, that the resulting unsubstituted bicycloheptene portion of the adduct is endo to the dichloromethano-containing structural portion. These facts, together with the application of the general rules relative to the direction of orientation in Diels-Alder adductions, lead to the belief that the product A–I has the endo-exo-exo structure represented by the equivalent structural formulas A–I–1.

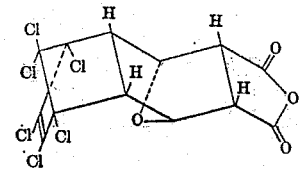

or

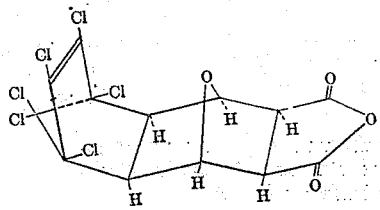

Instead of using the 7-oxabicyclo(2.2.1)-2-heptene, as illustrated by the foregoing furan-maleic anhydride adduct, as the dienophile, 7-oxabicyclo(2.2.1)-2,5-heptadienes (a 7-oxabicycloheptene containing two double bonds in the ring) can be utilized, such as the Diels-Alder adduct of furan and diethyl acetylenedicarboxylate. Thus, when hexachlorocyclopentadiene adducts via the Diels-Alder reaction with the adduct of furan and diethyl acetylenedicarboxylate, the product is 2,3-dicarbethoxy-5,6,7,8,9,9-hexachloro-1,4,4a,5,8,8a-hexahydro-1,4-epoxy-5,8-methanonaphthalene (A–II); the reaction is represented by the Equation II:

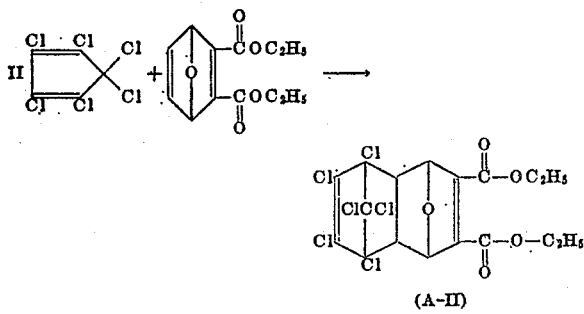

or

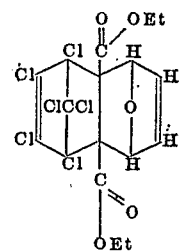

Here also the product is believed to have the endo-exo structure.

The use of alkyl-substituted 7-oxabicycloheptenes, such as are obtainable from alkyl furans adducted with dienophiles, in the preparation of the 1- and/or 4-alkyl compounds represented by formula A is illustrated by reactions III and IV:

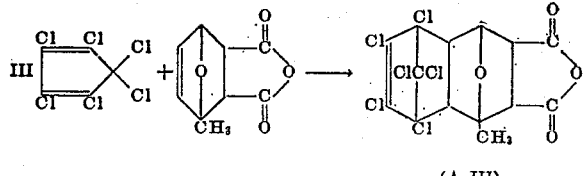

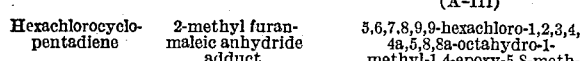

| Hexachlorocyclo-pentadiene | 2-methyl furan-maleic anhydride adduct | 5,6,7,8,9,9-hexachloro-1,2,3,4,4a,5,8,8a-octahydro-1-methyl-1,4-epoxy-5,8-methanonaphthalene-2,3-dicarboxylic anhydride |

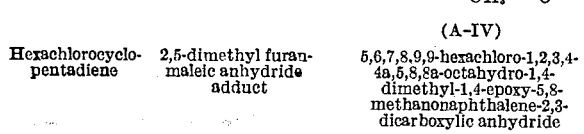

| Hexachlorocyclo-pentadiene | 2,5-dimethyl furan-maleic anhydride adduct | 5,6,7,8,9,9-hexachloro-1,2,3,4-4a,5,8,8a-octahydro-1,4-dimethyl-1,4-epoxy-5,8-methanonaphthalene-2,3-dicarboxylic anhydride |

The stereochemical structures of the products A–III and A–IV are considered to be the same as the stereochemical structure of the product A–I.

The use of other polyhalocyclopentadienes is illustrated by the adduction of 1,2,3,4-tetrachloro-1,3-cyclopentadiene with the furan-maleic anhydride adduct as represented in equation X.

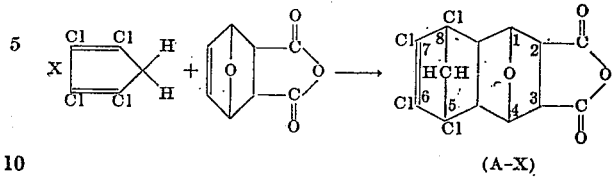

The product (A–X) is 5,6,7,8-tetrachloro-1,2,3,4,4a,5,8,8a-octahydro-1,4-epoxy-exo-endo - 5,8 - methano-exo-2,3-dicarboxylic anhydride.

As discussed already, the polar groups "Y" in the compounds produced by reactions such as represented in equations I–X can be modified to other suitable "Y" groups. Thus the anhydrides A–I, and A–III, A–IV and A–X can be hydrolyzed to corresponding dicarboxylic acids.

It is, of course, widely believed that the furan Diels-Alder adducts are highly unstable above room temperature and, as a matter of fact, heating the furan-maleic anhydride adduct in refluxing ether causes it to revert to its generators. In addition, the polyhalocyclopentadienes, with almost no exception, are added to dienophiles at appreciable rates only at temperatures at or above 100° C. In view of this combination of facts, heretofore there was little reason to believe that a Diels-Alder type of addition of a polyhalocyclopentadiene to a dienophile which is a furan adduct might be possible. Unexpectedly, however, it has been found that the Diels-Alder reaction between a furan-adduct and a polyhalocyclopentadiene can be obtained, in the presence of an inert solvent, even at temperatures below 60° C. This is the more surprising in view of the fact that the analogous reaction between, for example, as active a substance as bicyclo(2.2.1)-2,5-heptadiene and hexachlorocyclopentadiene, requires at least 18 hours, in the presence of excess dienophile as a solvent, for completion.

Hence, contrary to expectations, the conditions for the preparations of the products of this invention are in general those well known and applied to the Diels-Alder synthesis, the optimum conditions for a particular preparation being dependent, as will be understood on the reactivities of the selected reactants, and the stability of the furan adduct dienophile employed. In general the adduction of the polyhalocyclopentadiene with the furan-adduct dienophile is conducted at a temperature from ambient atmospheric temperature to a substantially elevated temperature, in the presence or absence of an added solvent, such as an aromatic hydrocarbon (toluene, xylenes), a ketone (acetone, methyl ethyl ketone) and ether, etc. When a solvent is used, the refluxing temperature of the solvent is usually a suitable reaction temperature.

Specific conditions and operations which are suitable for the practice of the invention are illustrated by the preparation of the furan-maleic anhydride adduct and the adduction of this adduct with hexachlorocyclopentadiene.

Preparation of 3,6-epoxy-1,2,3,6-tetrahydrophthalic anhydride:

One mol each of furan (68 g.) and maleic anhydride (98 g.) was added to 200 ml. of dry ethyl ether under constant agitation. The reaction was allowed to proceed at room temperature overnight. The resulting crystalline precipitate was collected on a filter and washed with cold ether after which it was dried in vacuo. The product had a melting point of 122–123° C. and was recovered in yield of 70%.

Hexachlorocyclopentadiene+furan-maleic anhydride adduct:

In a typical preparation, 50 g. (0.3 mol) of the furan-maleic anhydride adduct and 100 g. (0.36 mol) of hexachlorocyclopentadiene (hex) were dissolved in a minimum amount of hot acetone (220 ml.) and the solution refluxed at 55° C. for 66 hours. The solvent was then removed under slightly reduced pressure with concomitant precipitation of a white crystalline product. This product was washed with hexane to give 62% yield of a product with a melting point of 281–282° C. Recrystallization from acetone-hexane gave soft white crystals, M. P. 282–283° C. Analysis gave:

Calc. for $C_{13}H_6O_4Cl_6$: C, 35.6%; H, 1.37%; Cl, 48.5%; Neut. eq., 220. Found: C, 35.1%; H, 1.19%; Cl, 47.9%; Neut. eq., 216.

Similar results were obtained by different variations in the foregoing procedure. Thus, when the amount of solvent was reduced to 120 ml., the other conditions remaining constant, the yield fell off slightly, being 58%. Similarly, a solvent increase to 320 ml. reduced the yield slightly, to 56%. However, when a reflux period of 6 days was employed the yield was increased substantially to 73%.

Esterification of 5,6,7,8,9,9 - hexachloro-1,2,3,4,4a,5,8,-8a-octahydro-1,4-epoxy-5,8 - methanonaphthalene - 2,3-dicarboxylic anhydride with methanol:

The dimethyl ester was readily prepared by dissolving 1 part by weight of the above anhydride $C_{13}H_6O_4Cl_6$ in 10 parts by weight of methanol to which about ¼ part by weight of concentrated HCl had been added, and refluxing for two hours. Removal of the solvent under reduced pressure yielded a solid which gave, after recrystallization from a 1:1 ether-benzene mixture, an 80% yield of crystalline platelets with a melting point of 212–213° C. This product was redissolved in 1:1 ether-benzene, washed with dilute $NaHCO_3$ and water, dried, and recrystallized to give a product with a melting point of 214°–215° C. Analysis of the product:

Calc. for $C_{15}H_{12}O_5Cl_6$: C, 37.2%; H, 2.48%; Cl, 43.9%; Sap. eq. 243. Found: C, 37.2%; H, 2.21%; Cl, 43.6%; Sap. eq. 233.

Preparation of the monomethyl ester:

The mono-ester is prepared by esterification in the absence of added catalyst and under refluxing for an extended period of time with a smaller proportion of alcohol. Thus, when the adduct anhydride was dissolved in the minimum amount of hot methanol, and the solution refluxed for 16 hours or more, a crystalline solid melting at 191° C. was obtained in substantially quantitative yield. Recrystallization from ether gave a product with a melting point of 191–192° C., a saponification equivalent of about 240 (theor. is 236) and a neutralization equivalent of about 480 (theor. is 471) and analyzed for $C_{14}H_{10}O_5Cl_8$.

1,2,3,4-tetrachlorocyclopentadiene - 1,3+furan - maleic anhydride adduct (A–X):

The reactants, 1,2,3,4-tetrachlorocyclopentadiene-1,3 and the furan-maleic anhydride adduct (3,6-epoxy-1,2,3,6-tetrahydrophthalic anhydride) were dissolved in equal molar proportions in anhydrous acetone and the mixture refluxed at 55° C. for 24 hours. The solvent was then removed under reduced pressure; the resulting solid residue was recrystallized from acetone and then further purified by sublimation. The product was obtained as a white crystalline solid having a melting point of 285–6° C. Analysis gave:

Calc. for $C_{13}H_8Cl_4O_4$: C, 42.0%; 37.7% Cl; Neut. eq., 214. Found: C, 42.2%; 38.3% Cl; Neut. eq., 185.

The utility of the compounds of this invention has already been stated briefly. In this connection, it may be pointed out that they are unique in several respects which make them especially useful in various applications. The stable polyhalo portion makes them particularly useful as flameproofing agents in resinous and plastic compositions. The epoxy-phthalate character of the other portion of some of the compounds also lends to their usefulness as plasticizers in synthetic and natural resin compositions. The chlorinated portion contributes extreme pressure properties for lubrication while the epoxide provides for stabilization of the halogenated compound; the polar group, particularly when esterified with a higher molecular weight alcohol, provides for general mineral oil compatibility. The lower molecular weight esters are suitable additives for use in synthetic lubricants, particularly for their extreme pressure properties.

The invention claimed is:

1. A compound selected from the class consisting of polyhalo-1,4-epoxy-5,8-methanooctahydronaphthalene dicarboxylic acid and polyhalo1,4-epoxy-5,8-methanohexahydronaphthalene dicarboxylic acid containing from 2 to 6 middle halogen atoms on carbon atoms of the 5,6,7,8,9-carbon atoms ring and the acid anhydride and lower alkyl ester derivatives thereof.

2. A compound according to claim 1 wherein the halogen atoms are chlorine atoms.

3. A compound according to claim 1 wherein the halogen atoms are six chlorine atoms.

4. A 5,6,7,8,9,9 - hexachloro-1,2,3,4,4a,5,8,8a-octahydro-1,4-epoxy-5,8-methano-2-naphthalene compound according to claim 1.

5. 5,6,7,8,9,9-hexachloro-1,2,3,4,4a,5,8,8a - octahydro-1,4 - epoxy-5,8-methano-naphthalene-2,3-dicarboxylic anhydride.

6. The dimethyl ester of the compound of claim 5.

7. 5,6,7,8,9,9-hexachloro-1,4,4a,5,8,8a-hexahydro - 1,4-epoxy-5,8-methanonaphthalene-2,3-dicarbethoxy.

8. 5,6,7,8,9,9-hexachloro-1,2,3,4,4a,5,8,8a - octahydro-1-methyl - 1,4 - epoxy-5,8-methanonaphthalene-2,3-dicarboxylic anhydride.

References Cited in the file of this patent

UNITED STATES PATENTS

| | | |
|---|---|---|
| 2,655,513 | Kleiman | Oct. 13, 1953 |
| 2,655,514 | Kleiman | Oct. 13, 1953 |
| 2,705,235 | Kleiman | Mar. 29, 1955 |

OTHER REFERENCES

Dunlop: "The Furans," Reinhold Pub. Corp., New York, p. 63 (1953).